(12) United States Patent
Berne

(10) Patent No.: US 11,634,072 B2
(45) Date of Patent: Apr. 25, 2023

(54) CAMERA ASSEMBLY FOR AN INDUSTRIAL VEHICLE CAB

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 317 days.

(21) Appl. No.: 16/651,137

(22) PCT Filed: Nov. 29, 2017

(86) PCT No.: PCT/IB2017/001439
§ 371 (c)(1),
(2) Date: Mar. 26, 2020

(87) PCT Pub. No.: WO2019/106398
PCT Pub. Date: Jun. 6, 2019

(65) Prior Publication Data
US 2020/0238908 A1   Jul. 30, 2020

(51) Int. Cl.
*B60R 1/00*          (2022.01)
*B60R 11/04*         (2006.01)
(Continued)

(52) U.S. Cl.
CPC ............... *B60R 1/00* (2013.01); *B60R 11/04* (2013.01); *B62D 33/06* (2013.01); *H04N 23/54* (2023.01);
(Continued)

(58) Field of Classification Search
CPC ............... B60R 11/04; B60R 2011/004; B60R 2300/101; B60R 2300/802;
(Continued)

(56) References Cited

U.S. PATENT DOCUMENTS 9,403,491 B2 *   8/2016 Happy ..................... B60R 1/006
10,062,290 B2 *  8/2018 Dry ............................ H04N 5/44
(Continued)

FOREIGN PATENT DOCUMENTS

CN   201287675 Y  *  8/2009
CN   105905032 A  *  8/2016
(Continued)

OTHER PUBLICATIONS

International Search Report for International Patent Application No. PCT/IB2017/001439, dated Jul. 16, 2018, 9 pages.

*Primary Examiner* — John Villecco
(74) *Attorney, Agent, or Firm* — Withrow & Terranova, PLLC

(57) ABSTRACT

The camera assembly (50) comprises: —a supporting arm (51) having a main axis (A51), said supporting arm (51) including a first portion (41) and a second portion (42), the first portion (41) having a first end (53) provided with a mounting device (54) for mounting on a vehicle cab and a second end (57) coupled to the second portion (42); —a camera (52) arranged on said second portion (42) of the supporting arm (51), for providing an image of a surrounding area. The first portion (41) and the second portion (42) of the supporting arm (51) are coupled via coupling means (45) which are configured so that the second portion (42) can move relative to the first portion (41) between: —a first operative position, in which the camera (52) is adapted to provide an image of a first surrounding area; —and a second operative position, in which the camera (52) is adapted to provide an image of a second surrounding area distinct from the first surrounding area.

13 Claims, 4 Drawing Sheets

(51) Int. Cl.
   *B62D 33/06* (2006.01)
   *H04N 23/54* (2023.01)
   *B60R 11/00* (2006.01)

(52) U.S. Cl.
   CPC . *B60R 2011/004* (2013.01); *B60R 2011/0085* (2013.01); *B60R 2300/101* (2013.01); *B60R 2300/802* (2013.01)

(58) Field of Classification Search
   CPC .... B60R 2300/8046; B60R 2300/8026; B60R 2300/806
   See application file for complete search history.

(56) References Cited

U.S. PATENT DOCUMENTS

| | | | | |
|---|---|---|---|---|
| 10,759,354 | B2 * | 9/2020 | Berne | B60R 11/04 |
| 10,919,452 | B2 * | 2/2021 | Berne | B60Q 1/24 |
| 10,960,821 | B2 * | 3/2021 | Iida | B60R 11/04 |
| 2012/0062741 | A1 * | 3/2012 | Stimel, Jr. | B60R 1/00 348/148 |
| 2016/0065796 | A1 * | 3/2016 | Happy | H04N 5/2251 348/376 |
| 2017/0113615 | A1 * | 4/2017 | Fendt | B60K 35/00 |
| 2017/0341595 | A1 * | 11/2017 | Thompson | B60R 1/1207 |
| 2019/0132497 | A1 * | 5/2019 | Lang | B60R 1/076 |
| 2021/0009039 | A1 * | 1/2021 | Berne | B60R 1/0617 |
| 2022/0314881 | A1 * | 10/2022 | Gudarzi | H04N 7/181 |
| 2022/0332243 | A1 * | 10/2022 | McGirt | B60R 1/002 |
| 2022/0396322 | A1 * | 12/2022 | Gudarzi | B60T 8/172 |

FOREIGN PATENT DOCUMENTS

| | | | | |
|---|---|---|---|---|
| DE | 3900667 | A1 | 7/1990 | |
| DE | 102012015395 | B3 | 11/2013 | |
| DE | 102014006961 | A1 * | 11/2015 | B60R 1/00 |
| DE | 102021204052 | A1 * | 10/2022 | |
| DE | 102021111202 | A1 * | 11/2022 | |
| KR | 20070056314 | A * | 6/2007 | |
| WO | 2017/178859 | A1 | 10/2017 | |
| WO | WO-2017196165 | A1 * | 11/2017 | B60R 1/00 |

* cited by examiner

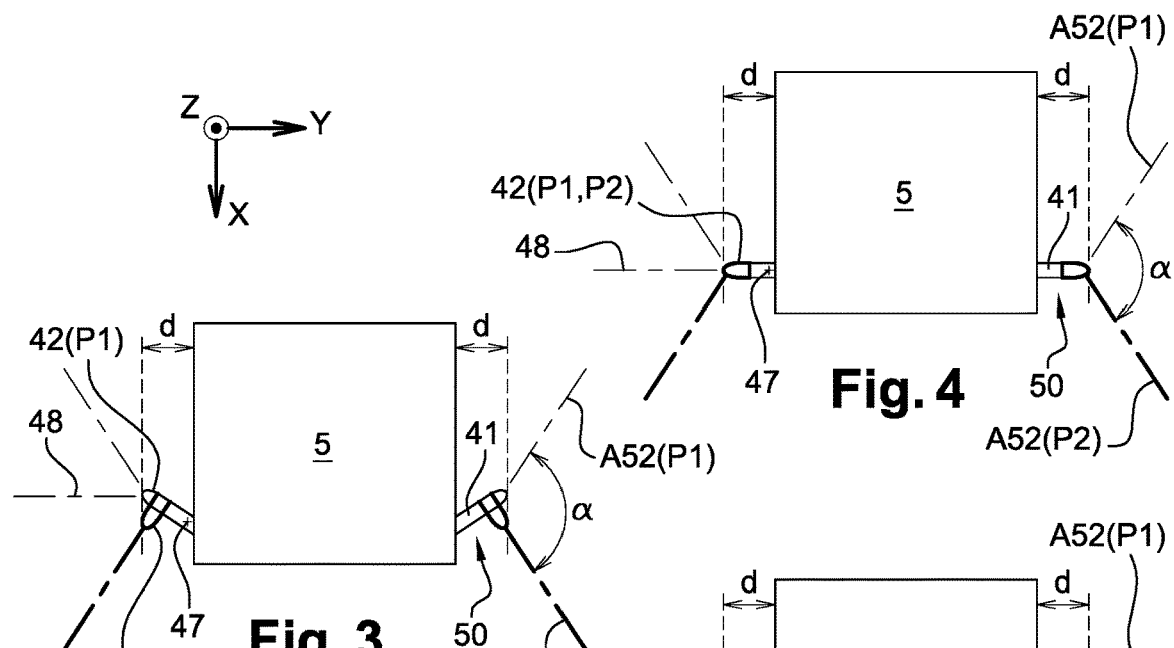
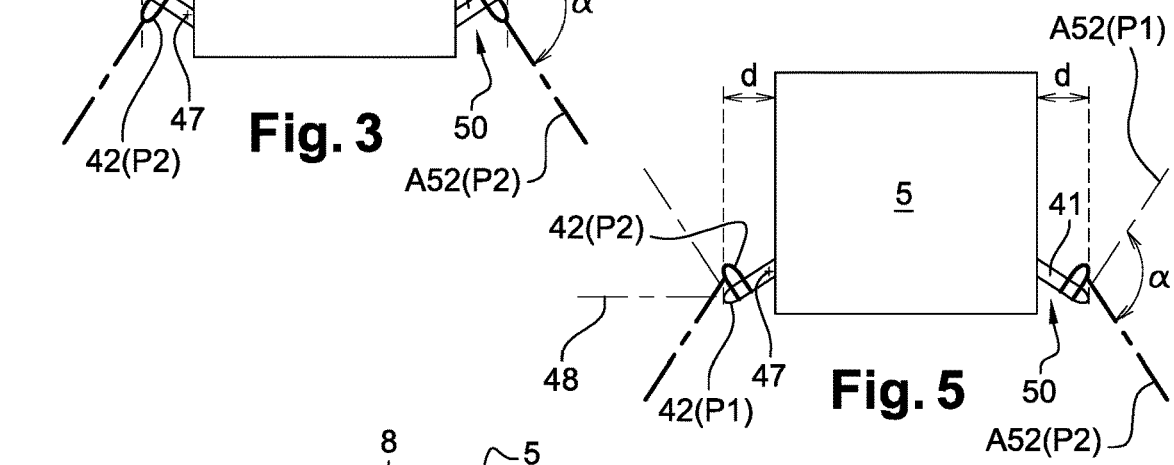
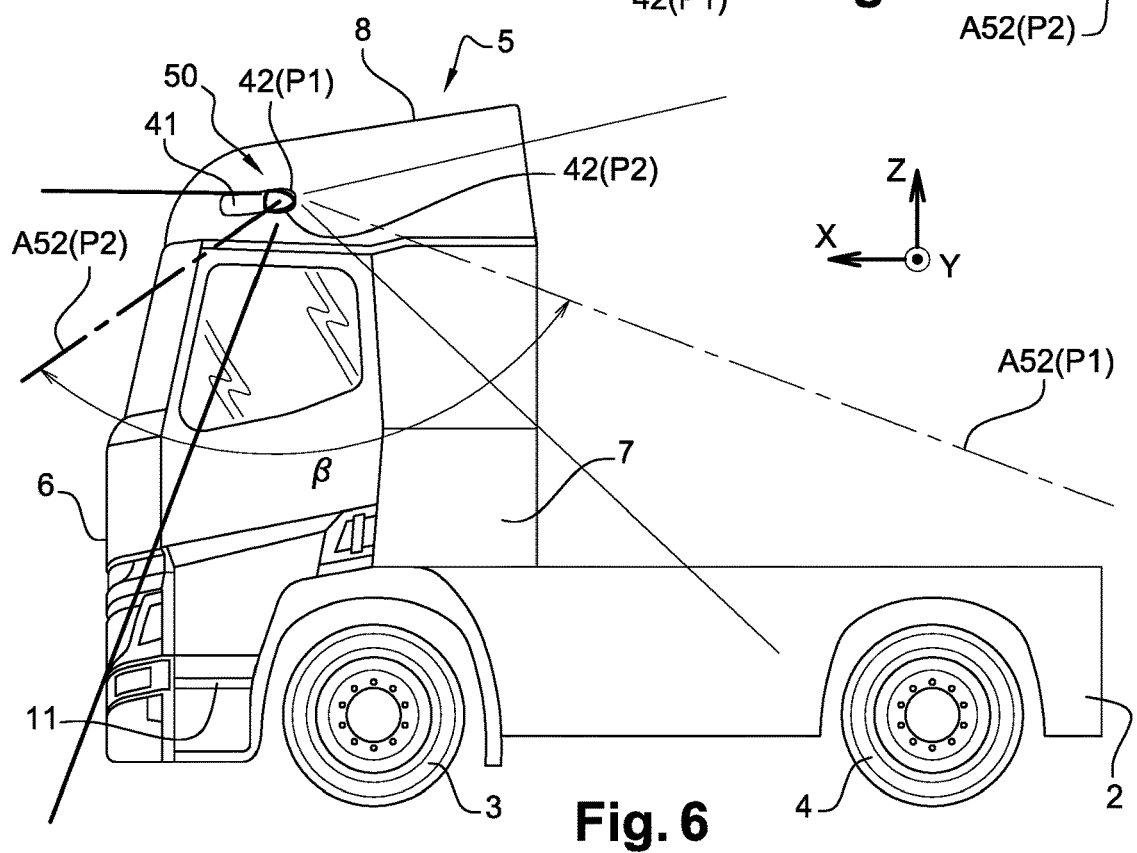

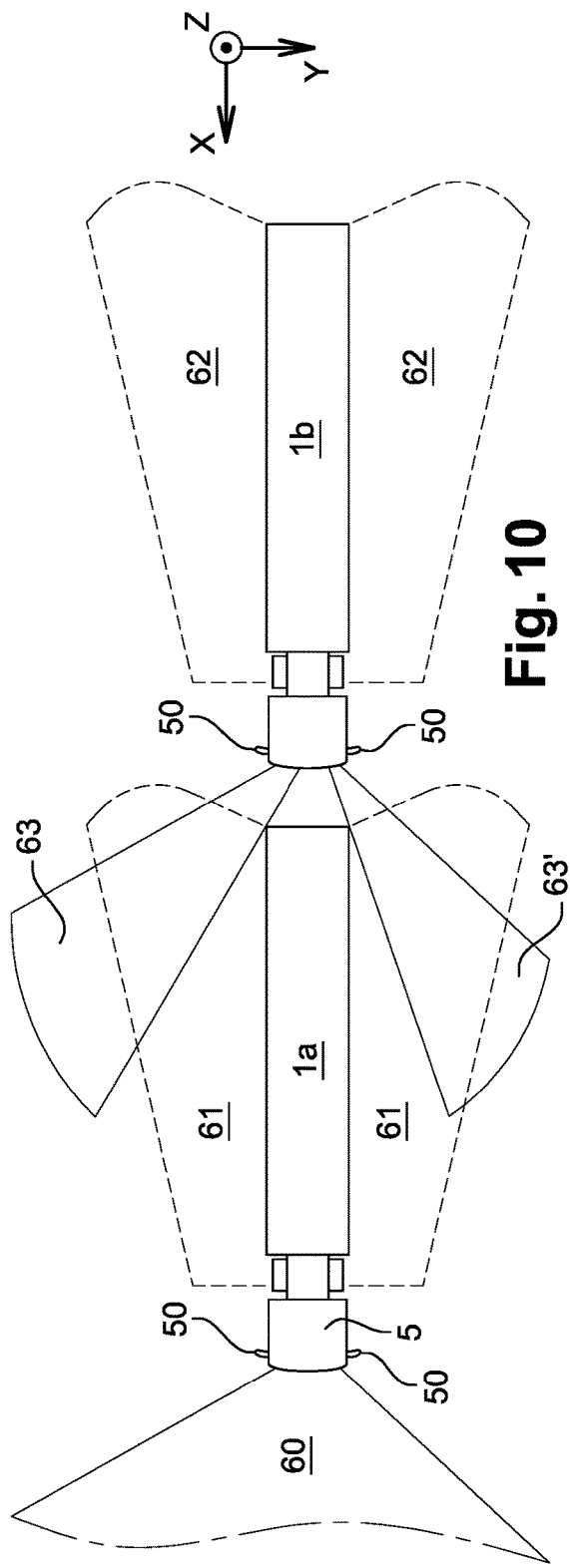
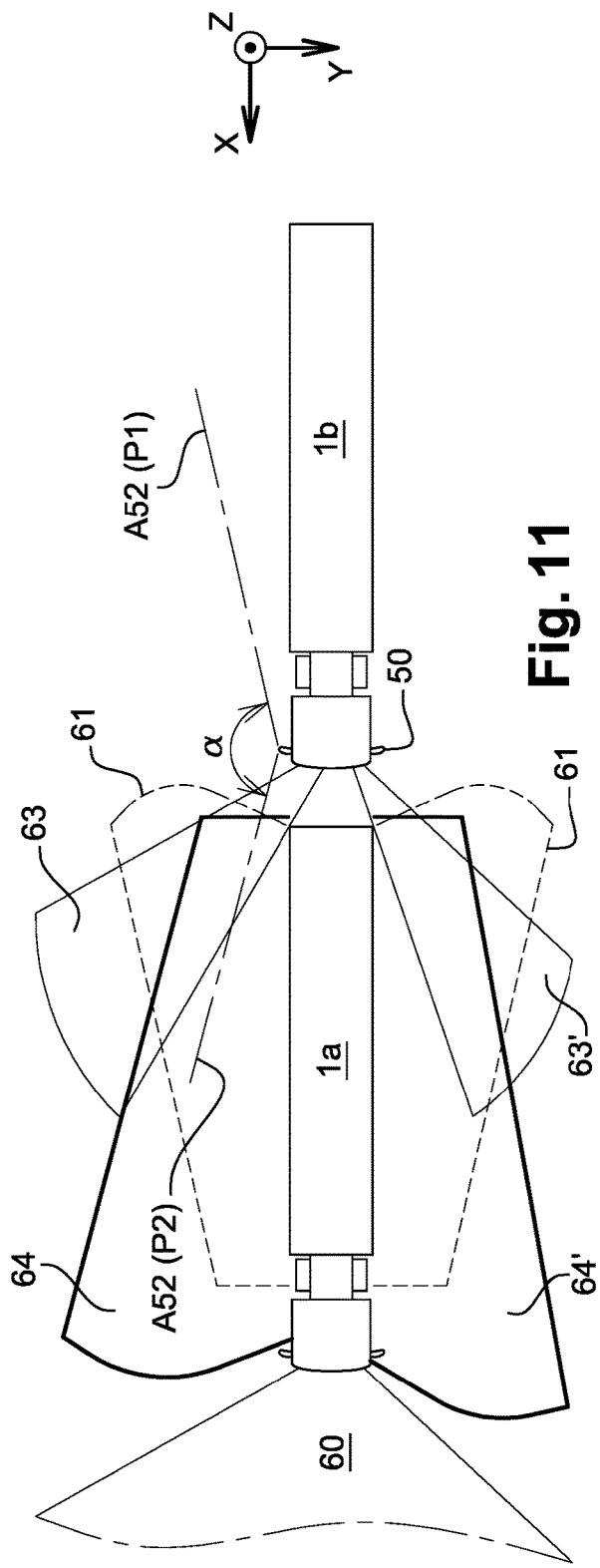

CAMERA ASSEMBLY FOR AN INDUSTRIAL VEHICLE CAB

This application is a 35 USC 371 national phase filing of International Application No. PCT/IB2017/001439, filed Nov. 29, 2017, the disclosure of which is incorporated herein by reference in its entirety.

TECHNICAL FIELD

The invention relates to a camera assembly designed to be mounted on an industrial vehicle cab, an industrial vehicle cab comprising such a camera assembly, and to an industrial vehicle comprising such a camera assembly or such a cab. The invention also relates to process for controlling a camera assembly of a vehicle.

The invention can be applied to several industrial vehicles, such as trucks, buses and construction equipment.

BACKGROUND

Vehicle platooning is an emerging and promising technology for the transport sector.

Platooning consists in grouping vehicles—especially trucks—one closely following the other. The vehicles are driven by smart technology, and mutually communicating. Platooning has many advantages:
  it improves traffic safety, because the driving control system allows the vehicles to accelerate or brake simultaneously; this further results in eliminating reactive distance needed for human reaction;
  it saves costs, as the vehicles drive close together at a constant speed; this also means lower fuel consumption and less $CO_2$ emissions;
  moreover, as platoons decrease the distances between vehicles, this allows increasing the capacity of roads; platooning also efficiently boosts traffic flows thereby reducing tail-backs.

However, a problem with platoons is that the driver of a vehicle which is not the first one cannot see the whole area in front of him, as the preceding vehicle obstructs the view. This vision obstruction is all the more significant as vehicles in the platoon are very close to each other. As a result, the driver of a following vehicle feels unsafe and completely dependent on technology. He cannot anticipate something occurring forward, nor see an exit he wants to take.

According to one solution envisaged to this problem, an image provided by a camera on the first vehicle of the platoon can be sent on a wireless network to the following vehicles, to be displayed on their respective monitors, for example.

Such a solution is not fully satisfactory, as it relies on wireless connections between the vehicles of the platoon, which may not be provided, or which may be dedicated to other purposes.

SUMMARY

An object of the invention is to provide a solution to improve visibility for a vehicle's driver, more specifically when the vehicle is a following vehicle in a platoon.

Another object of the invention is to improve visibility for a driver of a following truck in a platoon, without relying on a wireless connection between trucks in the platoon.

To that end, according to a first aspect, the invention relates to a camera assembly for an industrial vehicle cab, comprising:

a supporting arm having a main axis, said supporting arm including a first portion and a second portion, the first portion having a first end provided with a mounting device for mounting on the cab and a second end coupled to the second portion;
  a camera arranged on said second portion of the supporting arm, for providing an image of a surrounding area;
wherein the first portion and the second portion of the supporting arm are coupled via coupling means which are configured so that the second portion can move relative to the first portion between:
  a first operative position, in which the camera is adapted to provide an image of a first surrounding area;
  and a second operative position, in which the camera is adapted to provide an image of a second surrounding area distinct from the first surrounding area.

Because the supporting arm of the camera assembly can be put in distinct positions, the invention makes it possible to provide the driver with images of distinct surrounding areas, depending on his current needs. Specifically, but not exclusively, a driver of a following truck in a platoon can thus have an image of a rear area, or of a front area, depending on the situation.

The invention takes advantage of an element that is provided on many trucks, and does not require to implement expensive additional components, nor to use a wireless connection between trucks. Such existing element is the camera assembly mounted on the vehicle cab. With such an assembly, a camera is used in place of conventional mirrors, for providing an image of an area located rearwards of the vehicle. This image can typically be displayed on a monitor inside the driver's compartment. The invention only requires coupling means between the first portion and the second portion of the supporting arm, for allowing the above described movement.

The camera can be mounted on or housed in the supporting arm second portion. For example, the camera can be arranged near the free end of said second portion.

The terms defining locations or orientations (such as "front", "side", "rear" and the like) are used relative to the vehicle cab, in the mounted position of the camera assembly, i.e. when the camera assembly is mounted on the vehicle cab.

According to one embodiment, the camera having an optical axis, the optical axis in the first operative position and the optical axis in the second operative position are angled relative to each other. More specifically:
  in a horizontal plane in the mounted position of the camera assembly on the cab, said axes form an angle α having a minimum value of 90°, preferably 130°, more preferably 150°, and a maximum value of 200°, preferably 180°, more preferably 170°;
  and/or, in a vertical longitudinal plane in the mounted position of the camera assembly on the cab, said axes form an angle β having a minimum value of 90°, preferably 100°, more preferably 120°, and a maximum value of 160°, preferably 150°, more preferably 130°. Angle β can be around 125°.

In other words, the camera can provide an image of a rear area, in the first operative position, and an image of a front area, in the second operative position. The movement between the first and second operative positions can be a pivoting movement around a transverse axis (in the mounted position), or around the supporting arm main axis. Alternative solutions can also be envisaged.

The coupling means may be configured such that, in the first operative position, the first portion and the second portion of the supporting arm are substantially aligned along the main axis. For example, the main axes of the first portion and of the second portion can be in a same horizontal plane in the mounted position.

The coupling means can comprise pivoting means around a pivot axis which can be substantially transverse in the mounted position of the camera assembly on the cab.

In an embodiment, the first portion includes, from the first end to the second end:
an attachment portion;
an intermediate portion which is coupled to the second portion, and which is coupled to the attachment portion via additional coupling means configured so that the intermediate portion can move relative to the attachment portion between an active position, in which the camera can provide an image of a surrounding area of the cab, and a parking position.

In concrete terms, the attachment portion can be provided with the mounting device for mounting on the cab; the intermediate portion can be coupled to the second portion via the coupling means, and to the attachment portion via the additional coupling means.

In the active position, the second portion of the supporting arm can be either in the first operative position or in the second operative position relative to the first portion. In the parking position, the camera is not in use. For example, in the parking position, the supporting arm does not significantly protrude relative to the cab, being folded against the cab side wall, while in the active position, the supporting arm protrudes outwardly, so that the camera can provide an image of the appropriate area.

In the active position, the attachment portion and the intermediate portion can be substantially aligned along the main axis. In addition, or alternatively, in the parking position, a main axis of the intermediate portion and a main axis of the attachment portion can be angled relative to each other. In an embodiment, said main axes can form an angle of about 90°.

In the parking position, the second portion of the supporting arm may be in the first operative position relative to the first portion. For example, in said first operative position, the first portion and the second portion of the supporting arm may have main axes that substantially coincide.

The coupling means may comprise an actuator for moving the second portion of the supporting arm, and/or the additional coupling means may comprise an actuator for moving the intermediate portion of the supporting arm.

According to a second aspect, the invention relates to an industrial vehicle cab having a front wall, a top wall and two side walls, and further comprising a camera assembly as previously described, the supporting arm of the camera assembly being mounted on one cab wall and protruding outwardly from said wall so that the camera can provide an image of a surrounding area of the cab.

For example, the camera assembly can be mounted on a side wall, above the door provided for entering the driver compartment defined by the cab, and preferably close to the front wall. The cab can be devoid of side exterior mirrors. Alternatively, the supporting arm could be mounted on the roof, and arranged to protrude outwardly from the cab side wall, for allowing the camera to provide a satisfactory image of the concerned area.

The camera assembly mounted on the cab can be configured such that:
in the first operative position, the camera is adapted to provide an image of an area located rearwards;
and/or, in the second operative position, the camera is adapted to provide an image of an area located forward.

The camera assembly mounted on the cab can be configured such that, in the parking position, the camera is folded against the cab wall on which the camera assembly is mounted.

The coupling means can comprise pivoting means around a pivot axis which is substantially transverse relative to the cab. As regards the additional coupling means, they can comprise pivoting means around a pivot axis which is substantially vertical.

The cab may comprise a control unit connected to the camera assembly and capable of controlling the coupling means and/or additional coupling means to cause the second portion and/or intermediate portion to move, for example following the activation/deactivation of a platooning mode. This control unit can be the vehicle electrical control unit (ECU).

According to a third aspect, the invention relates to an industrial vehicle which comprises a camera assembly as previously described, or a cab as previously described.

According to a fourth aspect, the invention relates to a process for controlling a camera assembly of such a vehicle, wherein:
when the second portion of the supporting arm is in the first operative position, the process comprises controlling the coupling means to cause the second portion to move relative to the first portion, towards the second operative position, following the activation of a platooning mode;
and/or, when the second portion of the supporting arm is in the second operative position, the process comprises controlling the coupling means to cause the second portion to move relative to the first portion, towards the first operative position, following the deactivation of a platooning mode.

Besides, when the intermediate portion of the supporting arm is in the parking position, the process may comprise controlling the additional coupling means to cause the intermediate portion to move relative to the attachment portion, towards the active position, upon receipt of a vehicle activation signal. The vehicle activation signal can be a remote vehicle door unlocking command, which can be sent by the driver from the outside of the cab, when he approaches the vehicle, by means of the vehicle key or a similar actuator. Alternatively, the signal may be sent when the vehicle engine is turned on. Other signals can be envisaged.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3, 4 and 5 are schematic top views of various embodiments of a vehicle cab comprising camera assemblies, in a first and in a second operative positions;

FIG. 6 is a side view of a vehicle cab comprising a camera assembly shown in the first and in the second operative positions;

FIG. 10 is a top view of two trucks in a platoon, illustrating the area that the respective drivers can see without the invention;

FIG. 11 is a view similar to FIG. 7, the following truck being equipped with a camera assembly according to an embodiment of the invention.

DETAILED DESCRIPTION OF EXAMPLE EMBODIMENTS OF THE INVENTION

Figure 1:
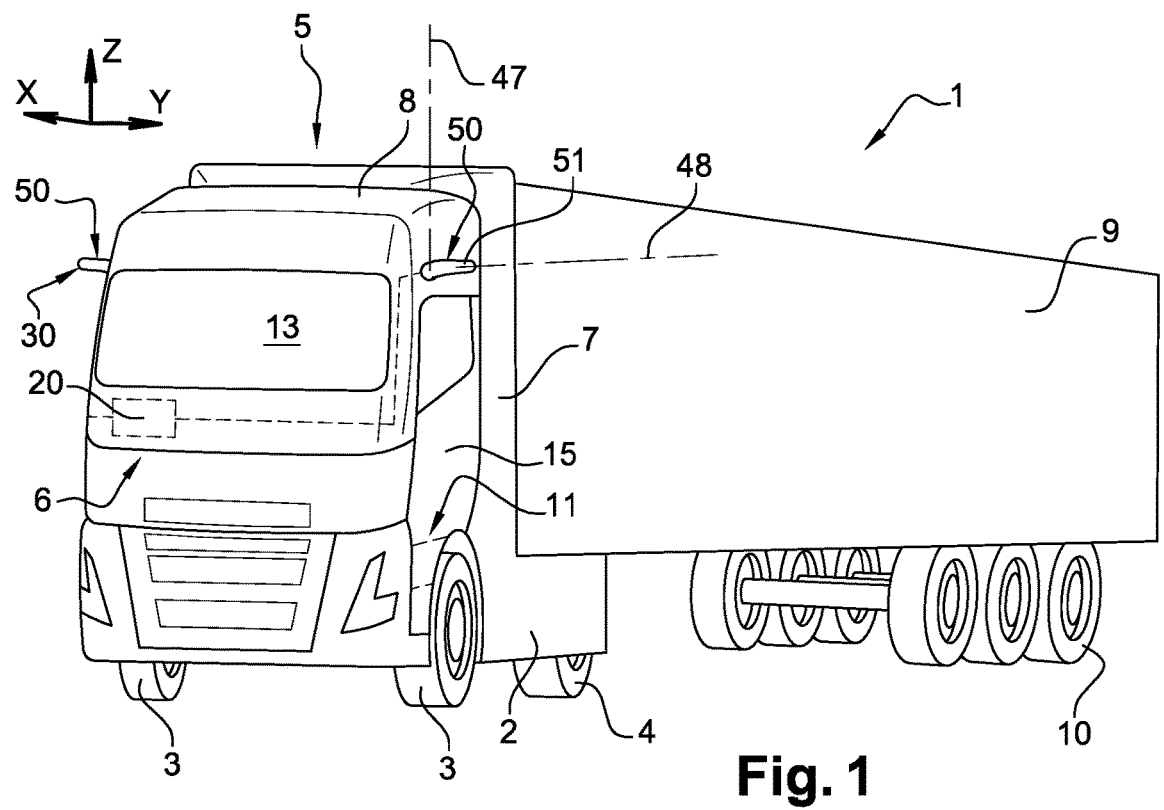
FIG. 1 is a perspective view of an industrial vehicle according to an embodiment of the invention, the vehicle comprising camera assemblies.

FIG. 1 shows a vehicle 1, more specifically an industrial vehicle. Although the invention will be described with respect to a truck, the invention is not restricted to this particular vehicle, but may also be used in other vehicles, such as a bus.

The vehicle 1 comprises a frame 2 supported by front wheels 3 and rear wheels 4 as well as a cab 5. The vehicle 1 can further comprise a cargo body 9 supported by wheels 10. Z is defined as the vertical direction, X is defined as the longitudinal direction of the vehicle 1, and Y is defined as the transversal direction of the vehicle 1.

The cab 5 has a front wall 6, two side walls 7 and a roof 8. It defines a driver compartment and comprises a side door 15 for closing an opening to said driver compartment. Below the opening and forward of the front wheels 3 is a step 11 for allowing the driver to climb up to/get down from the driver compartment. The step 11 can be covered by the side door 15 when it is in the closed position.

Furthermore, a camera assembly 50 is mounted on the cab 5. Basically, the camera assembly 50 comprises a supporting arm 51 and a camera 52 arranged on said supporting arm 51, for providing an image of an area surrounding the vehicle 1. The camera has an optical axis A52. Such a camera assembly 50 can typically be part of a so-called camera monitor system (CMS) which further includes a monitor (not shown) inside the driver's compartment for displaying the image provided by the camera 52. Thus, the vehicle 1 according to the invention can be devoid of side exterior mirrors, and possibly also devoid of an interior mirror.

Preferably, the supporting arm 51, especially the shape of its front face, is designed to form a wind deflector and not to significantly impair aerodynamics.

The cab 5 may further comprise a lighting system 30 for illuminating the step 11, which can be mounted on the supporting arm 51 of the camera assembly 50, or housed therein. For example, the lighting system 30 is configured to provide a light beam directed downwards, towards at least an area of the step 11, and preferably also towards an area of the ground at the bottom of the step 11. The light beam may be emitted through a lower wall of the supporting arm 51.

In the illustrated embodiment, a camera assembly 50 is mounted on each side wall 7 of the cab 5. Preferably, a camera assembly 50 can be mounted in an upper front area of each side wall 7, typically above the door 15. However, this should not be considered as limitative; for example, the camera assembly 50 could be mounted on the roof 8 of the cab 5.

The supporting arm 51 has a main axis A51. It includes a first portion 41 having a main axis A41, and a second portion 42, having a main axis A42. The first portion 41 comprises a first end 53 provided with a mounting device 54 for mounting on the cab 5, and a second end 57 coupled to the second portion 42. The supporting arm 51 can have a mounting end face 55 configured to cooperate with a cab side wall 7, i.e. for example substantially parallel to (X,Z) in the mounted position. Furthermore, the supporting arm 51 protrudes outwardly from the cab side wall 7, up to its free end 56, which is also the free end of the second portion 42.

The camera 52 is arranged on the supporting arm second portion 42, for example near the supporting arm free end 56.

In a non limiting embodiment, the first portion 41 may include, from the first end 53 to the second end 57:
- an attachment portion 43 having a main axis A43;
- an intermediate portion 44 which has a main axis A44, and which is coupled to the second portion 42 via coupling means 45, and to the attachment portion 43 via additional coupling means 46.

The additional coupling means 46, which can typically be pivoting means and comprise an actuator for moving the intermediate portion 44, make it possible for the intermediate portion 44 to move relative to the attachment portion 43 between an active position, in which the attachment portion 43 and the intermediate portion 44 are substantially aligned along the main axis A51, and a parking position. In other words, the intermediate portion 44 can pivot relative to the attachment portion 43 around a substantially vertical axis 47 (in the mounted position).

The active position is a protruding position allowing the camera 52 to capture images. In said active position, the attachment portion 43 and the intermediate portion 44 are substantially aligned along the main axis A51.

In the parking position, the camera 52 is folded against the cab wall on which the camera assembly 50 is mounted, for example along the cab side wall 7, to prevent damages. In said parking position, the main axis A44 of the intermediate portion 44 and the main axis A43 of the attachment portion 43 are angled relative to each other. For example, in a non-limiting embodiment, they can form an angle of about 90°. Besides, the main axes A41 and A42 of the first portion 41 and the second portion 42 of the supporting arm 51 substantially coincide.

According to an important feature of the invention, the coupling means 45 are configured so that the second portion 42 of the supporting arm 51 can move relative to the first portion 41 between:
- a first operative position P1, in which the camera 52 is adapted to provide an image of a first surrounding area;
- and a second operative position P2, in which the camera 52 is adapted to provide an image of a second surrounding area distinct from the first surrounding area.

This movement can only occur in the active position, not in the parking position.

The coupling means 45 can comprise pivoting means around a pivot axis 48 which can be substantially transverse in the mounted position of the camera assembly 50 on the cab 5. The coupling means 45 can comprise an actuator for moving the second portion 42 of the supporting arm 51.

Thus, the camera assembly 50 can be used:
- so that the camera 52 provides an image of an area located rearwards of the vehicle 1, in the first operative position;

and so that the camera 52 provides an image of an area located forward of the vehicle 1, in the second operative position.

FIGS. 3 to 5 show various possible configurations of the camera assemblies 50 in the active position.

Regulations imposes minimum and maximum values for distance d, along transverse direction Y, between a cab side wall 7 and the camera 52, to provide appropriate rearward visibility for the vehicle's driver.

In order to satisfy this requirement, and because the geometries of the cab 5 and of the supporting arm 51 of the camera assembly 50 can vary depending on design choices and vehicle applications, the camera assembly 50 can be arranged according to various configurations, which provide substantially identical field of visions.

Thus, in the first operative position P1, the main axis A51 of the supporting arm 51 can be oriented rearward (FIG. 3), transversally (FIG. 4), or forward (FIG. 5). Whatever the configuration, the first portion 41 and the second portion 42 of the supporting arm 51 can be substantially aligned along the main axis A51.

Whatever the configuration, in said first operative position P1, the camera optical axis A52 is oriented rearward, preferably towards the outside of the cab 5. Furthermore, in the second operative position P2, the second portion 42 of the supporting arm 51 has moved relative to the first portion 41, for example following a pivoting movement around substantially transversally oriented pivot axis 48, and the camera optical axis A52 is oriented forward, preferably towards the outside of the cab 5.

It has to be noted that, on FIGS. 3-6, fine lines are used for elements in the first operative position P1, while thick lines are used for elements in the second operative position P2.

Whatever the configuration, the camera assembly 50 can be designed, so that:
the optical axis A52 in the first operative position P1 and the optical axis A52 in the second operative position P2 form an angle α in a horizontal plane (X,Y), as shown on FIGS. 3-5 and 11. Angle α has a minimum value of 90°, preferably 130°, more preferably 150°, and a maximum value of 200°, preferably 180°, more preferably 170°;
the optical axis A52 in the first operative position P1 and the optical axis A52 in the second operative position P2 form an angle β in a vertical longitudinal plane (X,Z), as shown on FIG. 6. Angle β has a minimum value of 90°, preferably 100°, more preferably 120°, and a maximum value of 160°, preferably 150°, more preferably 130°.

Figure 2:
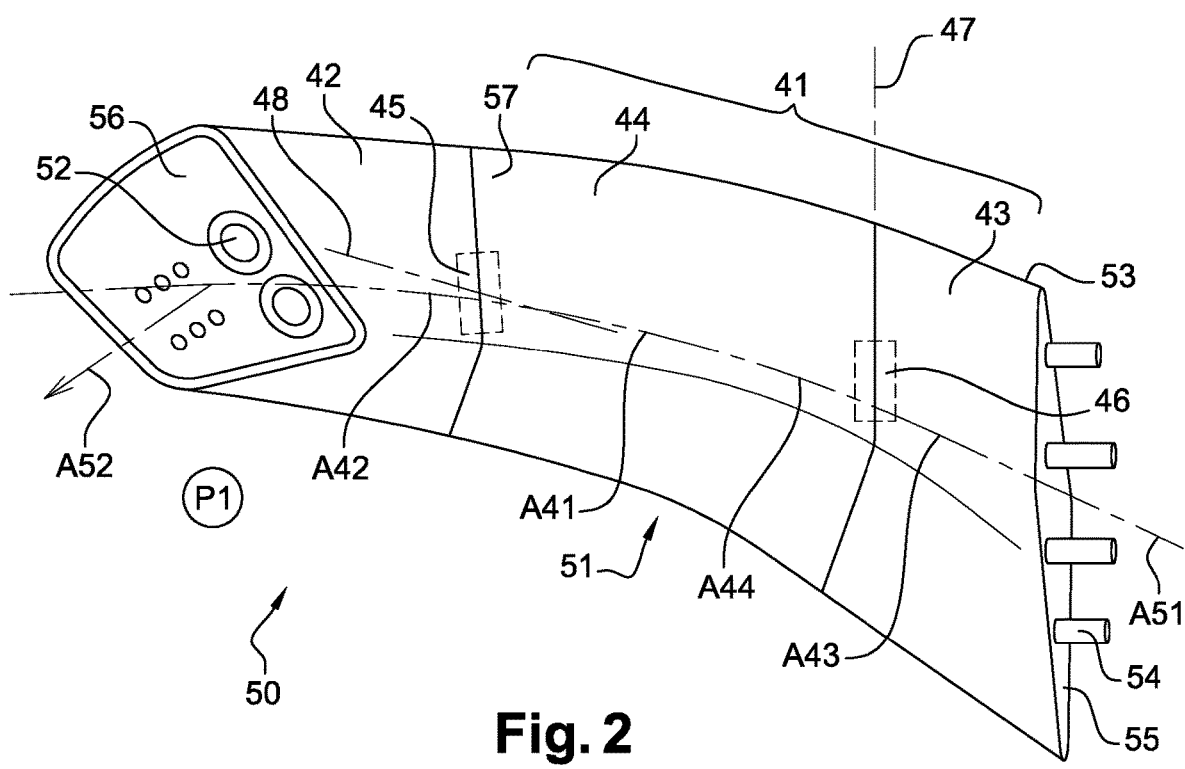
FIG. 2 is a perspective view of a camera assembly according to an embodiment of the invention, the camera assembly being in a first operative position.
Figure 7:
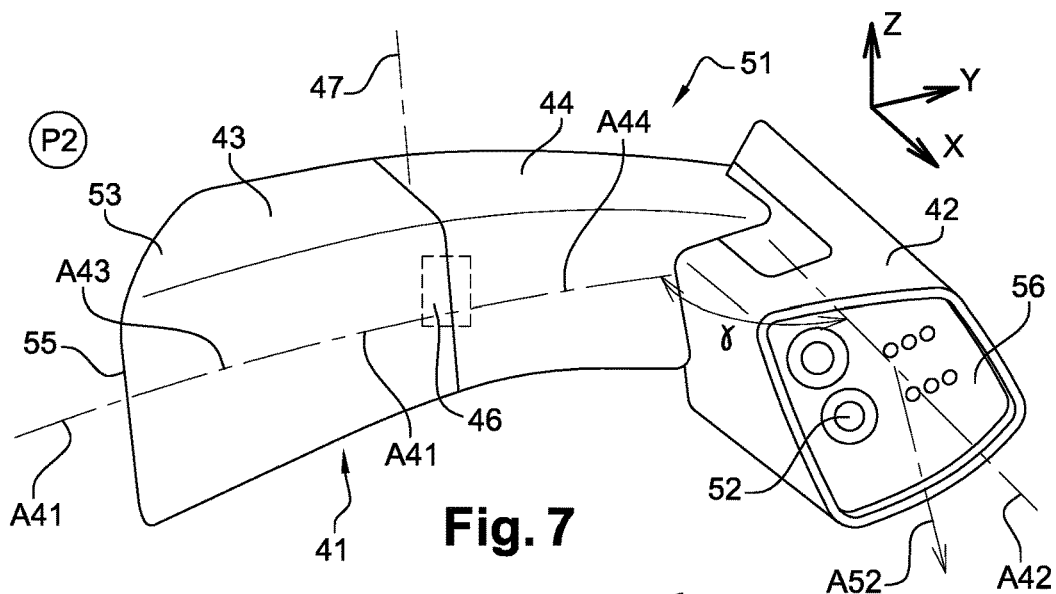
FIG. 7 is a schematic perspective view of the camera assembly of FIG. 2, in a second operative position.
Figure 8:
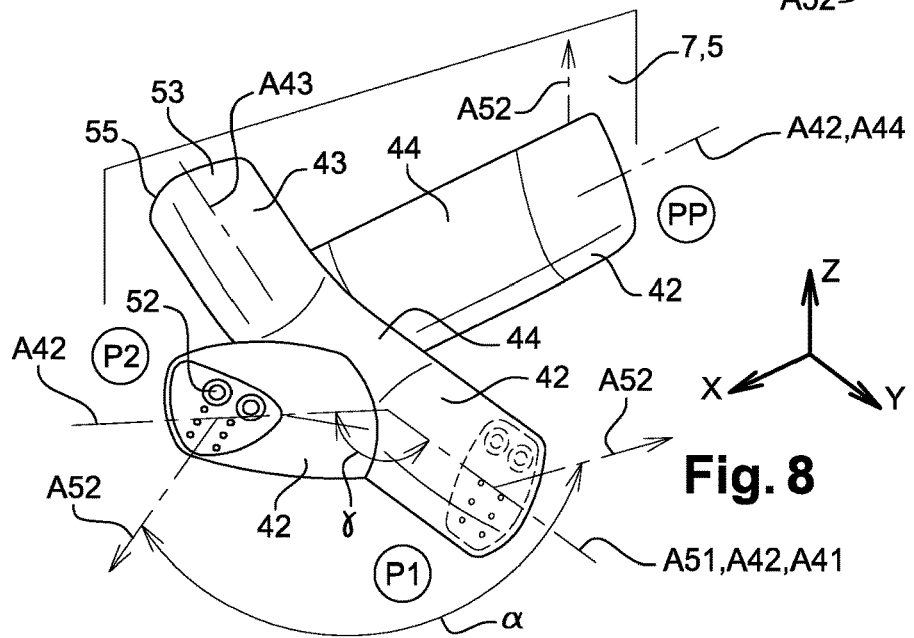
FIG. 8 schematically shows the camera assembly of FIG. 2, in various possible configurations, namely the first second operative position, the second operative position, and a parking position.

FIGS. 2, 7 and 8 show a non-limiting specific embodiment of a camera assembly according to the invention.

In the first operative position P1, illustrated on FIG. 2, the first portion 41 and the second portion 42 of the supporting arm 51 are substantially aligned along the main axis A51.

In the second operative position P2, schematically illustrated on FIG. 7, the main axis A41 of the first portion 41 substantially coincides with the supporting arm main axis A51, while the main axis A42 of the second portion 42 can be angled relative to the supporting arm main axis A51 by an angle γ (see FIGS. 7 and 8). Angle γ can have a minimum value of 90°, preferably 130°, more preferably 150°; it can have a maximum value of 180°, more preferably 170°. For example, the main axes A41, A42 of the first portion 41 and of the second portion 42 can be in a same horizontal plane in the mounted position.

FIG. 8 schematically shows the three above described possible configurations of the supporting arm 51, namely:
in the active position, the first operative position P1;
in the active position, the second operative position P2;
and the parking position PP.

As can be schematically seen on FIG. 8, the optical axis A52 of the camera 52 in the first operative position P1 and the optical axis A52 of the camera 52 in the second operative position P2 form an angle α. Angle α can have a minimum value of 90°, preferably 130°, more preferably 150°; it can have a maximum value of 200°, preferably 180°, more preferably 170°.

The cab 5 further comprises an electrical control unit (ECU) 20 connected to the camera assembly 50, for example by means of wires housed in the supporting arm 51. The control unit 20 is capable of controlling the coupling means 45 to cause the second portion 42 to move relative to the intermediate portion 44, and of controlling the additional coupling means 46 to cause the intermediate portion 44 to move relative to the attachment portion 43.

The invention is particularly advantageous for trucks pertaining to a platoon, especially for the following trucks.

Figure 9:
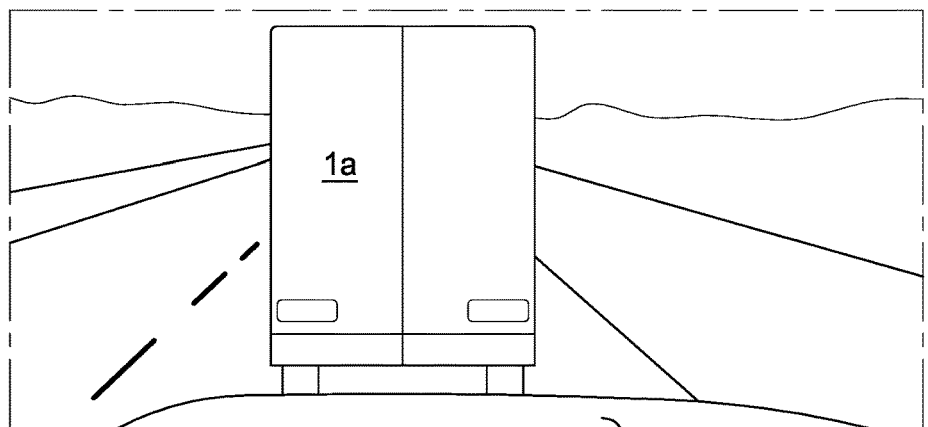
FIG. 9 shows the obstructed view of a driver of a following truck in a platoon.

Indeed, as can be seen on FIGS. 9 and 10, the first vehicle 1a of a platoon obstructs the view of the driver of the second vehicle 1b. More generally, the view of the driver of a following vehicle is obstructed by the preceding vehicle. This problem is all the more critical as platooning means that each vehicle closely follows the preceding one.

As can be seen on FIG. 10, the driver of the first vehicle 1a can directly see a front area 60, and indirectly see, via the camera assemblies 50, a rear area 61 on each side of the vehicle.

FIG. 10 also shows the areas that are visible for the driver of the second vehicle 1b, without the invention, i.e. with side mirrors or with conventional camera assemblies having a camera 52 directed rearwards. The driver of the second vehicle 1b indirectly sees, via the camera assemblies 50, a rear area 62 on each side of the vehicle, similarly to the driver of the first vehicle 1a. However, the front area directly visible by the driver of the second vehicle 1b being obstructed by the first vehicle 1a, the driver of the second vehicle 1b can directly see separate front areas 63, 63', on each side of the first vehicle 1a, but not a front area located in the longitudinal direction X.

The invention allows increasing the visible front area for the driver of the second vehicle 1b, as shown on FIG. 11. Said driver still directly sees the separate front areas 63, 63'. Moreover, with the camera assemblies 50 in the second operational position, the driver of the second vehicle 1b also indirectly sees two additional separate front areas 64, 64', on each side of the first vehicle 1a, through an image provided by the cameras 52, and for example displayed on a monitor inside the cab 5.

FIG. 11 also schematically shows angle α between the optical axis A52 of the camera 52 in the first operative position P1 and the optical axis A52 of the camera 52 in the second operative position P2. As can be seen, as the camera assemblies 50 are in the second operative position, the driver of the second vehicle 1b no longer indirectly sees a rear area 62 on each side of the vehicle, which is of less importance and poses no particular problem. Alternatively, it could be envisaged to have one camera assembly in the first operative position, and the other camera assembly in the second operative position, with two distinct display zones on the monitor inside the cab 5. Alternatively, when in platoon mode, the rear view could be provided by an additional camera assembly located on the cab and/or on the trailer.

According to an embodiment of the invention, the control unit 20 is capable of controlling the coupling means 45 following the activation/deactivation of a platooning mode.

In other words, the camera assembly 50 can be controlled according to the following process:

when the second portion 42 of the supporting arm 51 is in the first operative position P1, controlling the coupling means 45 to cause the second portion 42 to move relative to the first portion 41, towards the second operative position P2, following the activation of a platooning mode;

and/or, when the second portion 42 of the supporting arm 51 is in the second operative position P2, controlling the coupling means 45 to cause the second portion 42 to move relative to the first portion 41, towards the first operative position P1, following the deactivation of a platooning mode.

In practice, the platooning mode can be activated/deactivated by an action from the vehicle driver, such as pressing a button or touching a tactile key on a monitor. It can be envisaged that other events lead to the movement of the supporting arm 51 from a configuration to another, such as an emergency command signal.

The process can further comprise controlling the additional coupling means 46 to cause the intermediate portion 44 to move relative to the attachment portion 43 from the parking position towards the active position, for example upon receipt of a vehicle activation signal.

Because the driver of any following vehicle in a platoon gets a significantly less obstructed view of what is ahead of the preceding truck, the invention provides increased comfort and safety for said driver, and makes it easier for him to anticipate some events, such as an exit to take.

This advantage is obtained without using any wireless connections between vehicles, but only relying on the vehicle cameras, which can be an existing component of said vehicle.

It is to be understood that the present invention is not limited to the embodiments described above and illustrated in the drawings; rather, the skilled person will recognize that many changes and modifications may be made within the scope of the appended claims.

The invention claimed is:

1. A camera assembly for an industrial vehicle cab, comprising:
    a supporting arm having a main axis, said supporting arm including a first portion and a second portion, the first portion having a first end provided with a mounting device for mounting on the cab and a second end coupled to the second portion;
    a camera arranged on said second portion of the supporting arm, for providing an image of a surrounding area;
    wherein the first portion and the second portion of the supporting arm are coupled via a coupler which is configured so that the second portion can move relative to the first portion between:
    a first operative position, in which the camera is adapted to provide an image of a first surrounding area; and
    a second operative position, in which the camera is adapted to provide an image of a second surrounding area distinct from the first surrounding area;
    wherein the first portion includes, from the first end to the second end:
    an attachment portion;
    an intermediate portion which is coupled to the second portion, and which is coupled to the attachment portion via an additional coupler configured so that the intermediate portion can move relative to the attachment portion between an active position, in which the camera can provide an image of a surrounding area of the cab, and a parking position;
    wherein:
    the camera has an optical axis; and
    the optical axis in the first operative position and the optical axis in the second operative position form an angle (a) in a horizontal plane in the mounted position of the camera assembly on the cab, said angle (a) having a minimum value of 90° and a maximum value of 170°; and
    the optical axis in the first operative position and the optical axis in the second operative position form an angle (b) in a vertical longitudinal plane in the mounted position of the camera assembly on the cab, said angle (b) having a minimum value of 90° and a maximum value of 160°; and
    wherein the coupler is configured to move the second portion relative to the first portion between the first operative position and the second operative position only in the active position and not in the parking position.

2. The camera assembly of claim 1, wherein the coupler is configured such that, in the first operative position, the first portion and the second portion of the supporting arm are aligned along the main axis.

3. The camera assembly of claim 1 wherein the coupler is configured to pivot around a pivot axis which is transverse in the mounted position of the camera assembly on the cab.

4. The camera assembly of claim 1, wherein, in the active position, the attachment portion and the intermediate portion are aligned along the main axis, and in that, in the parking position, a main axis of the intermediate portion and a main axis of the attachment portion are angled relative to each other.

5. The camera assembly of claim 1, wherein, in the parking position, the second portion of the supporting arm is in the first operative position relative to the first portion.

6. The camera assembly of claim 1, wherein the coupler comprises an actuator for moving the second portion of the supporting arm, and the additional coupler comprises an actuator for moving the intermediate portion of the supporting arm.

7. An industrial vehicle cab having a front wall, a top wall, two side walls, and a camera assembly comprising:
    a supporting arm having a main axis, said supporting arm including a first portion and a second portion, the first portion having a first end provided with a mounting device for mounting on the cab and a second end coupled to the second portion;
    a camera arranged on said second portion of the supporting arm, for providing an image of a surrounding area;
    wherein the first portion and the second portion of the supporting arm are coupled via a coupler which is configured so that the second portion can move relative to the first portion between:
    a first operative position, in which the camera is adapted to provide an image of a first surrounding area; and
    a second operative position, in which the camera is adapted to provide an image of a second surrounding area distinct from the first surrounding area;
    wherein the supporting arm of the camera assembly is mounted on one cab wall and protrudes outwardly from said wall so that the camera can provide an image of a surrounding area of the cab;

wherein the first portion includes, from the first end to the second end:
an attachment portion;
an intermediate portion which is coupled to the second portion, and which is coupled to the attachment portion via an additional coupler configured so that the intermediate portion can move relative to the attachment portion between an active position, in which the camera can provide an image of a surrounding area of the cab, and a parking position;
wherein:
the camera has an optical axis; and
the optical axis in the first operative position and the optical axis in the second operative position form an angle (a) in a horizontal plane in the mounted position of the camera assembly on the cab, said angle (a) having a minimum value of 90° and a maximum value of 170°; and
the optical axis in the first operative position and the optical axis in the second operative position form an angle (b) in a vertical longitudinal plane in the mounted position of the camera assembly on the cab, said angle (b) having a minimum value of 90° and a maximum value of 160°; and
wherein the coupler is configured to move the second portion relative to the first portion between the first operative position and the second operative position only in the active position and not in the parking position.

8. The industrial vehicle cab of claim 7, wherein the camera assembly is mounted on the cab and configured such that:
in the first operative position, the camera is adapted to provide an image of an area located rearwards; and
in the second operative position, the camera is adapted to provide an image of an area located forward.

9. The industrial vehicle cab of claim 7,
wherein the camera assembly is mounted on the cab and configured such that, in the parking position, the camera is folded against the one cab wall on which the camera assembly is mounted.

10. The industrial vehicle cab of claim 7, wherein the coupler is configured to pivot around a pivot axis which is transverse relative to the cab.

11. The industrial vehicle cab of claim 7,
wherein
the coupler and the additional coupler are configured to be electrically controlled to cause the second portion and intermediate portion to move.

12. A method for controlling a camera assembly of a vehicle, the camera assembly comprising a supporting arm including a first portion and a second portion coupled to the first portion via a coupler, the first portion having a first end provided with a mounting device for mounting on the cab, and the second portion having a camera arranged thereon, the camera having an optical axis, the method comprising:
when the second portion of the supporting arm is in a first operative position to provide an image by the camera of a first surrounding area, controlling the coupler to cause the second portion to move relative to the first portion, towards a second operative position, to provide an image of a second surrounding area distinct from the first surrounding area, following the activation of a platooning mode; and
when the second portion of the supporting arm is in the second operative position, controlling the coupler to cause the second portion to move relative to the first portion, towards the first operative position, following the deactivation of a platooning mode;
wherein the optical axis in the first operative position and the optical axis in the second operative position form an angle (a) in a horizontal plane in the mounted position of the camera assembly on the cab, said angle (a) having a minimum value of 90° and a maximum value of 170°, and the optical axis in the first operative position and the optical axis in the second operative position form an angle (b) in a vertical longitudinal plane in the mounted position of the camera assembly on the cab, said angle (b) having a minimum value of 90° and a maximum value of 160°;
wherein the first portion includes, from the first end to the second end:
an attachment portion;
an intermediate portion which is coupled to the second portion, and which is coupled to the attachment portion via an additional coupler configured so that the intermediate portion can move relative to the attachment portion between an active position, in which the camera can provide an image of a surrounding area of the cab, and a parking position; and
wherein controlling the coupler to cause the second portion to move relative to the first portion towards the second operative position and controlling the coupler to cause the second portion to move relative to the first portion, towards the first operative position comprise controlling the coupler to cause the second portion to move only in the active position and not in the parking position.

13. The method of claim 12, further comprising:
when the intermediate portion of the first portion of the supporting arm is in the parking position, controlling the additional coupler to cause the intermediate portion attached to the second portion to move relative to the attachment portion of the first portion, towards the active position to provide the image of the surrounding area of the cab, upon receipt of a vehicle activation signal.

* * * * *